Nov. 21, 1933.    R. E. BUCK    1,935,938
TIRE VALVE
Filed May 18, 1931
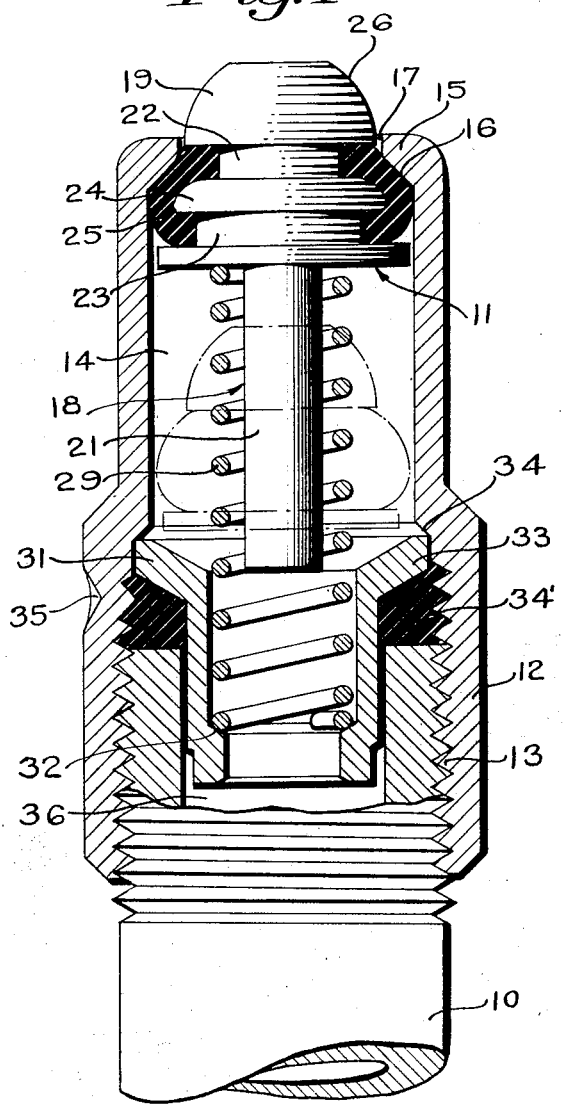
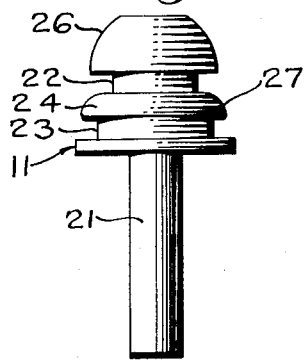
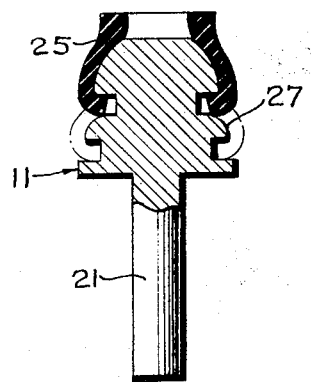
INVENTOR
Russell E. Buck
BY Bean, Brooks & Henry
ATTORNEY Patented Nov. 21, 1933

1,935,938

UNITED STATES PATENT OFFICE 1,935,938

TIRE VALVE

Russell E. Buck, Kalamazoo, Mich., assignor to Sterling Automotive Products Corporation, Buffalo, N. Y.

Application May 18, 1931. Serial No. 538,339

1 Claim. (Cl. 152—12)

This invention relates to improvements in valve mechanisms for use in pneumatic tires.

This invention more particularly relates to valves located in a cap applied to a valve stem of a pneumatic tire through which air may be supplied to the tire without the necessity of removal of the cap. Special attention is directed in this invention to the construction of the valve cap parts with the object of obtaining a simple and efficient valve mechanism including a live rubber seating member, portions of the valve construction being devised to provide means for mounting the seating member under tension.

The structure of the valve also permits the location of a seat therefor in the extremity of the cap thus practically obviating the possibility of dust deposit within the valve opening.

In the drawing:

Fig. 1 is a vertical cross section through a valve cap attached to a valve stem shown partly in section.

Fig. 2 is a side elevation of the valve body.

Fig. 3 is a side elevation of the resilient seating portion before assembly with the valve head.

Fig. 4 is a partial sectional view through the valve head showing the resilient seating member being applied thereto.

Referring particularly to the drawing, a valve cap has been provided which is adapted to be secured to the free end of a valve stem 10 of a pneumatic tire. The valve cap is provided with air sealing means in the form of a movable valve indicated at 11 which is provided with a portion protruding through the device and depressible to unseat the valve for inflating or deflating purposes.

The valve cap consists of a housing or shell member 12 having an internal threaded portion 13 at one extremity adapted to be secured to the free end of a tire stem and having a cylindrical chamber 14 terminating at the free end of the housing in an annular inwardly extending flange 15. The flange 15 is formed to provide an angular internal seating portion 16 and an orifice 17. A valve 18 is mounted for axial movement within the chamber 14 and is adapted to seat on the valve seat 16. The valve includes a body portion consisting of a cylindrical head portion 19 and a co-axial stem portion 21. The head portion is provided with a pair of spaced annular grooves 22 and 23 defining therebetween a flange 24, the outer groove 22 being deeper than the groove 23. The flange 24 is utilized as a mounting means for a seating member indicated at 25 which preferably comprises a length of live rubber tubing having an internal diameter of less than the outside diameter of the flange 24. The extremity of the head portion indicated at 26 is rounded or tapered to facilitate assembly of the seating member with the flange of the head portion. As shown in Fig. 4 the seating member 25 is applied by stretching over the portion 26 of the head whereupon one end thereof engages in the groove 22. Further movement of the seating member in a downward direction causes it to roll over the flange 24 thus inverting itself and causing the opposite end thereof to enter into the groove 23 as shown in dotted lines in Fig. 4.

It has been found particularly desirable to bevel the peripheral face of the flange 24 to accord with the angle of the valve seat 16, and to also construct the flange 24 so that its outside diameter is slightly greater than the diameter of the orifice 17. The results of this construction are that the resilient seating member 25 conforms to the contour of the flange, and, when it is properly seated against the seat 16, the substantially parallel faces 27 and 16 of the flange and the seat, respectively, exert a uniform pressure upon the resilient seating member therebetween without injury to the same. In addition to this, the fact that the flange 24 is of greater diameter than the orifice 17 insures a proper metal backing for the resilient member 25 so that it can not be stressed severely enough to exit through the throat of the orifice 17.

As shown in Fig. 1, a resilient device for maintaining the seating member on its seat 16 is provided and comprises a coil spring 29 engaging the head portion arranged about the stem portion 21 of the valve body. The lower portion of the spring is mounted within the chamber 29 of a mounting member 31, such chamber being provided with a shoulder indicated at 32 for engaging the lower extremity of the spring. The mounting member is provided with an annular flange 33 at its top extremity adapted to engage a shoulder 34 provided in the housing 12. A resilient packing member 34' is engaged about the mounting member immediately beneath the flange 33 thereof. The mounting member is retained in the shell by exteriorly punching portions of the shell to deform the metal thereof in the interior as shown at 35, although any other retaining method may be utilized.

When the valve cap is screwed on the end of the tire stem the lower portion of the seating member 31 extends into the opening 36 of the stem and the packing member 34 is compressed between the top of the tire stem and the flange 33 of the mounting member to effectively seal such connection. When thus mounted the spring retains the valve in its upward position with the seating member 25 engaging against the seat 16 and with the portion 26 of the head extending through the orifice 17 of the housing. The pressure of the spring is also sufficient to deform the seating member so that it will spread radially and actively engage the walls of the chamber 14. The fact that the groove 22 is deeper than groove 23 insures the equal distribution of rubber on either side of the seat 16 during the desired seating operation and provides sufficient rubber above the seat to supply the slight downward urge caused by such seating. Upon opening of the valve the rubber is released for a slight upward action. This movement is advantageous as it prevents the rubber from "setting".

When the valve is opened by depressing the portion 26 as shown in broken lines in Fig. 1, the seating member is returned to a normal position in spaced relation to the walls of the chamber 14. During such downward movement the stem 21 is axially guided by the coils of the spring 29. When thus depressed the air enters through the orifice 17 and from thence about the space between the seating portion 25 and the walls of the chamber 14, through the chamber 29 of the seating member to the interior of the tire stem.

Upon releasing the valve the spring urges the valve upward, upon which the portion 26 of the head engages through the orifice 17 and due to its conical shape centers the valve for proper seating. The use of live rubber under tension in the seating member has been found to provide an excellent seal since the nature of the material is such that it readily conforms to any irregularity of the valve seat or to impediments thereon such as particles of dust, without destroying the seal.

What is claimed is:

A valve head comprising a head portion formed with a pair of spaced annular grooves providing a circular flange therebetween, and a tubular seating member resiliently engaging about said flange with end portions entered in the grooves in the head portion.

RUSSELL E. BUCK.